No. 810,700. PATENTED JAN. 23, 1906.
H. BESSER.
MOLDING MACHINE.
APPLICATION FILED APR. 19, 1905.

2 SHEETS—SHEET 1.

WITNESSES:
Geo. W. Naylor
A. E. Fay.

INVENTOR
Herman Besser
BY Munn
ATTORNEYS

No. 810,700. PATENTED JAN. 23, 1906.
H. BESSER.
MOLDING MACHINE.
APPLICATION FILED APR. 19, 1905.
2 SHEETS—SHEET 2
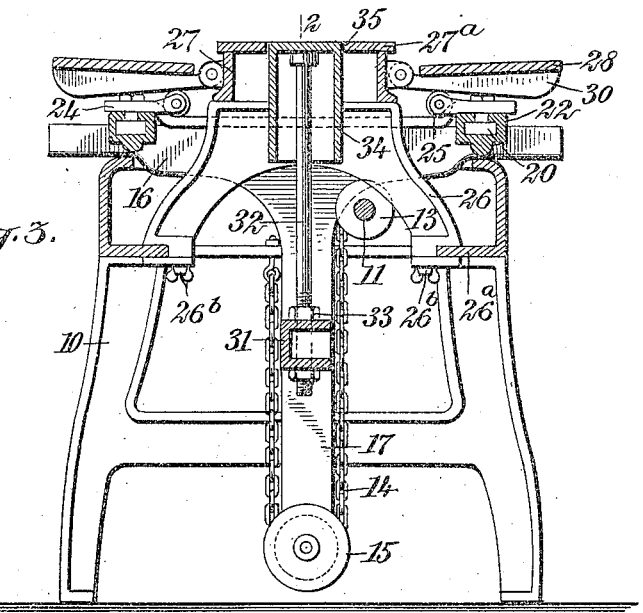
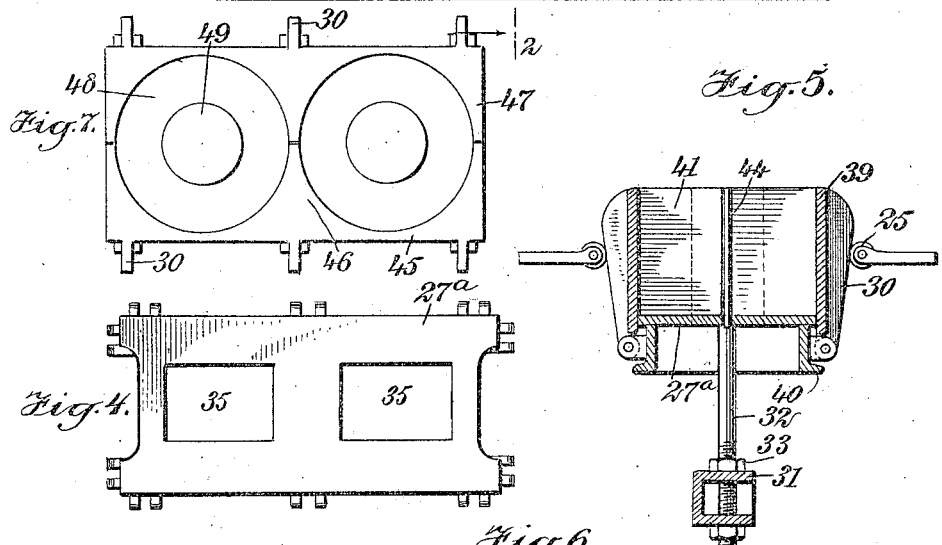
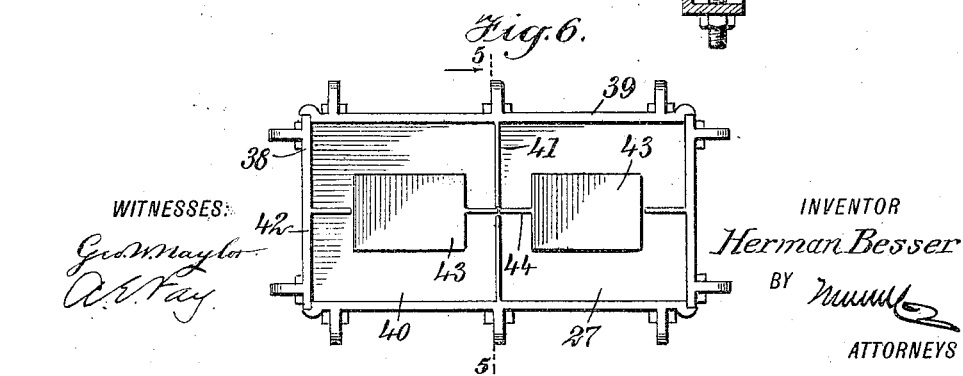
WITNESSES:
G. W. Naylor
A. V. Fay
INVENTOR
Herman Besser
BY
ATTORNEYS

UNITED STATES PATENT OFFICE.

HERMAN BESSER, OF ALPENA, MICHIGAN.

MOLDING-MACHINE.

No. 810,700.  Specification of Letters Patent.  Patented Jan. 23, 1906.

Application filed April 19, 1905. Serial No. 256,397.

*To all whom it may concern:*

Be it known that I, HERMAN BESSER, a citizen of the United States, and a resident of Alpena, in the county of Alpena and State of Michigan, have invented a new and Improved Molding-Machine, of which the following is a full, clear, and exact description.

My invention relates to a machine for molding plastic materials to form building-blocks, drain-tiles, sewer-pipes, and, in fact, any other article capable of being formed of a plastic substance.

The principal objects of my invention are to provide means for rapidly disassembling the mold parts of a machine of the above-mentioned character, so as to free the molded object with little effort and in a very short time, to provide means for molding articles of various sizes and shapes by simple adjustments of the mold parts, and to increase the simplicity of construction and operation of machines of this character.

Further objects of the invention will appear in the course of the general description.

Reference is to be had to the accompanying drawings, forming a part of this specification, in which similar characters of reference indicate corresponding parts in all the figures.

Figure 1:
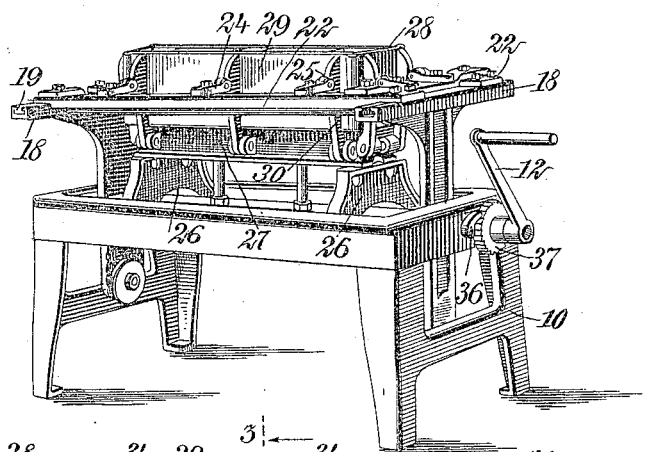
Figure 2:
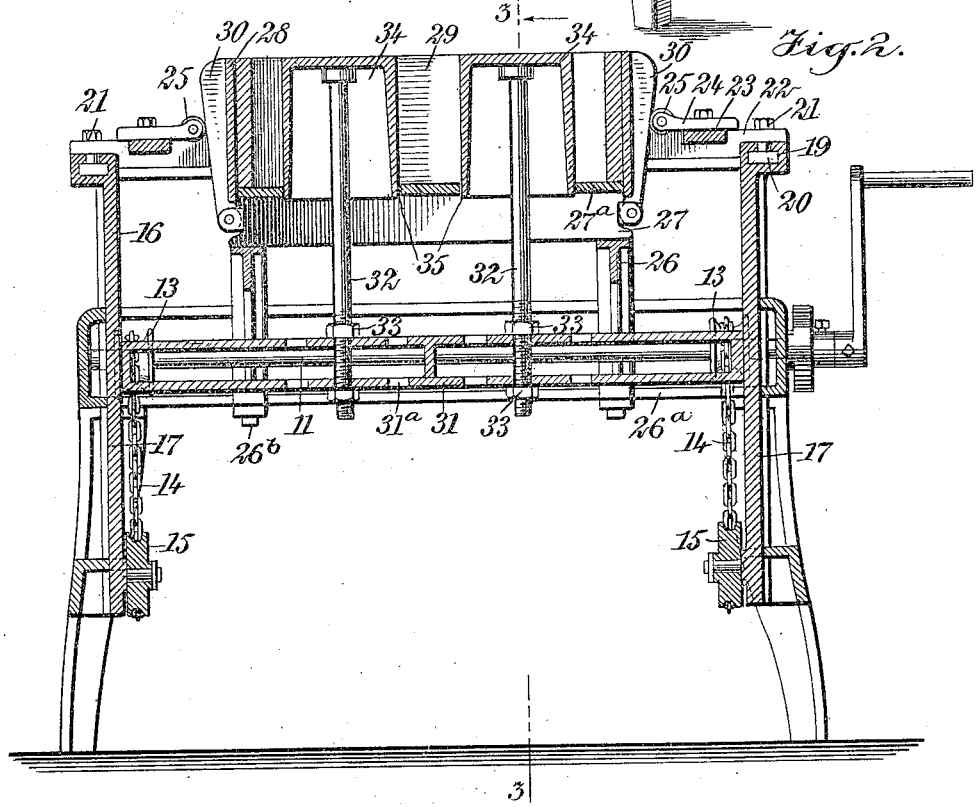

Figure 1 is a perspective view of a block-molding machine constructed in accordance with the principle of my invention. Fig. 2 is a longitudinal sectional view of the same on the line 2 2 of Fig. 3. Fig. 3 is a transverse sectional view on the line 3 3 of Fig. 2. Fig. 4 is a plan of a pallet. Fig. 5 is a transverse sectional view on the line 5 5 of Fig. 6, showing a modification coming within the scope of my invention. Fig. 6 is a plan of the device shown in Fig. 5, and Fig. 7 is a plan of another modification.

The machine is provided with a main frame 10, on which is journaled an operating-shaft 11, having a crank 12 for operating the shaft to move the mold parts. This shaft is provided with one or more pulleys or sheaves 13, to each of which a flexible member—as, for example, a chain 14—is connected. These chains pass over idler-pulleys 15, preferably located below the pulleys 13 and rotatably mounted upon a sliding frame 16. This frame is preferably provided with downwardly-extended projections 17 for receiving these pulleys. These projections and the pulleys may conveniently be located at the ends of the machine just inside of the frame.

The frame 16 carries at its upper end a pair of ways 18, having inverted-T-shaped slots 19. In these slots are adapted to be mounted a plurality of T-bolts 20, having nuts 21 for tightening them in position. These bolts pass through longitudinal bars 22, which support a cross-bar 23, having upon it a series of plates 24, which carry rollers 25. It will be obvious that the plates can be adjusted back and forth in the T-slots and that when the frame slides these plates and rollers will slide with it. These rollers project from the inside surfaces of the ways 18 toward each other and obviously constitute means for moving and locking the end walls of the mold. For the purpose of accomplishing the same operation upon the side walls of the mold the bars 22 are provided with plates 24, like those described above and having rollers 25. The frame is provided with a plurality of bridges 26, which are movably mounted on ways $26^a$ and are adapted to be secured in adjusted position by bolts $26^b$. They support sills 27, carrying a bottom plate $27^a$. The adjustment of the bridges is for the purpose of permitting the use of sills and molds of different lengths. Pivotally attached to the outer edges of the sills are the end plates 28 and side plates 29 of the mold. Both of these plates are provided with cam-surfaces or inclined planes 30, with which the rollers 25 are adapted to engage. The raising of the frame 16, with the bars 22 and 23, will close the mold through the operation of the rollers 25 on the cam-surfaces 30 in an obvious manner, and the returning of the frame 16 to its lowermost position will permit the sides and ends of the mold to open to a position such as that shown in Fig. 3.

Upon the frame 16 and extending from one end thereof to the other is a table 31, having perforations $31^a$, through which pass a series of standards 32, each one being provided with screw-threads and with adjusting-nuts 33, by which its height with respect to the table can be regulated. These standards support cores 34, and the bottom plate is provided with perforations 35 for the reception of the cores.

The operation of the machine will be readily understood. With the parts in the position shown in Figs. 1 and 2, the molding material is placed in the mold and tamped. When the molding operation is completed, a pulley 36 on the side of the frame is disengaged from the ratchet-wheel 37 on the shaft 11, and by the weight of the parts the frame 16 will settle to its lowest position, automatically drawing the cores and opening the end and side walls of the mold. In order to prevent jar, the operator preferably retains control by means of the crank 12. After the molded article is removed the parts are restored to the molding position by turning the crank 12, and the operation can then be repeated.

While I have illustrated and described a particular form in which my invention may be embodied, it will be clear that there are many other forms which it may take. As practically illustrating this statement attention is called to Figs. 5 and 6, which show a mold for producing a plurality of blocks having depressions in their side walls. In this instance the mold has end walls 38 and side walls 39, similar in a general way to the parts 28 and 29 shown in the other figures and pivoted in a similar manner. These walls are provided with cam-surfaces 30 for receiving the rollers 25, as before, and are pivoted to sills 40 in a similar manner. The side walls, however, are provided with partitions 41, which extend half-way through the mold, so that when the parts are in molding position these walls will register with each other and form a complete partition across the mold to separate one block from another. The end walls are similarly provided with partitions 42. Cores 43 are provided and mounted on the table 31 by means of standards 32 in the same manner as before; but in order to complete the longitudinal partition the plates that carry the cores may be provided with dividing-plates 44, which come up through slots in the pallets and form complete partitions to separate several blocks formed in the mold at one time.

A preferred form of mold for tiles is shown in Fig. 7. In this the side walls 45 are provided with partitions 46, similar to the partitions 41 in some respects, but having curved surfaces, so as to constitute a portion of the circumference of a cylindrical mold. They also have projections 47 at their ends formed in a similar manner, and both the partitions and projections terminate at the center of the mold, so that the end plates are entirely done away with and the molds do not have to have any other walls than the two side plates and a bottom plate 48. These molds are preferably provided with cores 49.

Having thus described my invention, I claim as new and desire to secure by Letters Patent—

1. In a molding-machine, the combination of a frame having ways thereon, a bridge adjustably mounted on said ways, a mold bottom plate supported by said bridge, said bottom plate being perforated, a core mounted to move through the perforations in the bottom plate, mold-walls movably mounted with respect to the bottom plate, means for moving the core, and means connected with said core-moving means for moving the mold-walls and locking them.

2. In a molding-machine, the combination of a frame having inwardly-extending ways longitudinally mounted thereon, a plurality of bridges adjustably mounted on said ways, sills mounted on said bridges, a bottom plate supported by said sills, side plates pivotally mounted on the sills, said bottom and side plates constituting a mold, a frame movably mounted on the frame of the machine, a core mounted on said frame and adapted to pass through the bottom plate longitudinally, and cross-bars adjustably mounted on said movable frame and located outside the mold, said bars being provided with means for engaging and locking the mold-walls.

3. In a molding-machine, the combination of a mold having a wall provided with a projection constituting a partition for the mold pivoted at the lower end thereof, said wall being provided with a projection having a face gradually diverging upwardly from its lower end, a bar mounted adjacent to said wall and provided with a roller for engaging said surface, means for reciprocating the bar and a movable core having a projection constituting a partition for the mold.

4. The combination of a mold consisting of a bottom plate, side walls and end walls, said side and end walls being pivoted to the bottom plate and provided with inclined surfaces on their exteriors, said surfaces diverging upwardly from the walls, a reciprocable frame mounted upon the outside of the mold and provided with rollers engaging said inclined surfaces and comprising two pairs of bars adjustably secured together, and means for reciprocating said frame.

5. The combination of a mold consisting of a bottom plate, side walls and end walls, said side and end walls being pivoted to the bottom plate and provided with inclined surfaces on their exteriors, said surfaces diverging upwardly from the walls, a reciprocable frame mounted upon the outside of the mold and provided with rollers engaging said inclined surfaces, means for reciprocating said frame, said frame being provided with a downwardly-extended projection, a pulley mounted on said projection, a shaft provided with a pulley, and a flexible member secured to the pulley on the shaft passing under the first-named pulley and secured at the other end in a stationary position.

6. In a molding-machine, the combination of a mold having movable walls, a movable frame having means for locking said walls in closed position, said frame being provided with a depending projection, a pulley rotatably mounted on said projection, a shaft, a pulley on said shaft, a flexible member having one end secured in stationary position passing under the pulley on the projection and secured to the pulley on the shaft, a ratchet-wheel on the shaft, and a pawl for engaging the ratchet-wheel.

7. In a molding-machine, the combination of a mold having movable walls, a movable frame for moving and locking said walls, and means for moving said frame; said means comprising a downwardly-extending projection on the frame, a pulley on said projection, a flexible connection having one end secured in a stationary position and passing under said pulley, a shaft upon which said connection is adapted to be wound, and means on the shaft for rotating it and taking up the flexible connection.

8. In a molding-machine, the combination of a mold having movable walls, a stationary perforated bottom board, a core adapted to pass through the perforation in the bottom board, a standard on which the core is mounted, said standard being provided with screw-threads, a movable table for supporting the standard, said table having a series of perforations through any one of which the standard is adapted to project, and nuts for securing said screw-threaded portion of the standard to the table in adjusted positions.

9. In a molding-machine, the combination of a mold having movable walls and a perforated bottom board, a core adapted to pass through the perforation in the bottom board, a standard on which the core is mounted, a table for supporting the standard, means for adjustably securing the standard to the table, and means for simultaneously moving the core through the perforation in the bottom board and locking the mold-walls in closed position.

In testimony whereof I have signed my name to this specification in the presence of two subscribing witnesses.

HERMAN BESSER.

Witnesses:
W. R. HYATT,
O. W. BISHOP.